Figure 1:
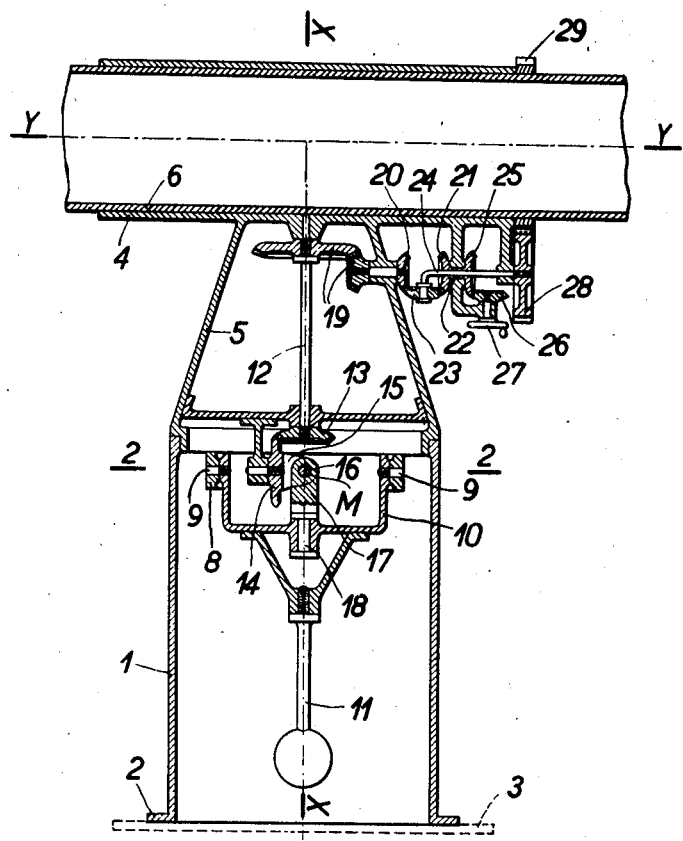

Nov. 20, 1934.    A. STEINLE ET AL    1,981,529
STABILIZED RANGE FINDER
Filed Sept. 30, 1932    3 Sheets-Sheet 1

Inventors:
Adolf Steinle
Otto Schreiber

Nov. 20, 1934.    A. STEINLE ET AL    1,981,529
STABILIZED RANGE FINDER
Filed Sept. 30, 1932    3 Sheets-Sheet 2

Inventors:
Adolf Steinle
Otto Schreiber

Patented Nov. 20, 1934

1,981,529

UNITED STATES PATENT OFFICE 1,981,529

STABILIZED RANGE FINDER

Adolf Steinle and Otto Schreiber, Jena, Germany, assignors to firm N. V. Nederlandsche Instrumenten Compagnie "Nedinsco," Venlo, Netherlands Application September 30, 1932, Serial No. 635,616
In Germany September 25, 1931

2 Claims. (Cl. 33—73)

We have filed applications in Germany, September 25, 1931, and Italy, November 13, 1931.

The invention concerns a rangefinder for horizontal and vertical rotations mounted on craft moving on unstable support, for instance on board ship.

The object of the invention, which provides for a rangefinder mounted on craft moving on unstable support a comparatively simple stabilization fulfilling all practical requirements, comprises on the one hand a body cardanically disposed on the craft and given a definite position relative to the space by a stabilizing means and, on the other hand, a device for so coupling the rangefinder to this body that fluctuations of the craft impart to the rangefinder a rotation about its axis for vertical rotation, the angle of this rotation being at any horizontal direction of the rangefinder relative to the craft equal to that angle through which the fluctuations of the craft make the said body and the craft rotate relatively to each other about the two cardanic axes of the body in that plane which is at right angles to the axis for vertical rotation of the rangefinder.

The coupling device is conveniently provided with a gear whose parts are movably mounted on that part of the support for the rangefinder which partakes of the horizontal rotation of same and of which one part is rotatable at the said cardanically mounted body about two axes intersecting at right angles at the point of intersection of the cardanic axes of the body, one of these axes being vertical when the body is stabilized, and the gear being so constructed that the relative adjustments of its parts, which are a measure for the altitudinal adjustment of the rangefinder at fluctuations of the craft, always correspond to the relative inclinations of the body and the craft in the said plane. A suitable constructional form is arrived at by making the gear consist of two bevel wheels which mesh with each other and are rotatably mounted at the said part of the support for the rangefinder about two axes intersecting at right angles at the point of intersection of the cardanic axes of the said body, one of the said two axes being parallel to the axis for horizontal rotation of the rangefinder.

An especially simple rangefinder stabilization according to the invention is arrived at by constructing the said body as a platform which is maintained horizontal by a stabilizing means and has such a position relative to the rangefinder that the point of intersection of its cardanic axes lies in a plane that contains the axis for vertical rotation of the rangefinder and is parallel to the axis for horizontal rotation of the rangefinder.

If the rangefinder and the said body are housed in a turret so mounted on the craft for rotation about an axis that a rotation of this turret about this axis entails a horizontal rotation of the rangefinder, and if the stabilization of the body is effected by a stabilizing means the exterior cardanic axis of which has an unchangeable position relative to the craft, it is convenient to provide that the cardanic bearing of the body forms part of a support which partakes of the rotations of the turret relative to the craft and is rotatable relatively to the turret about an axis parallel to the axis of rotation of this turret, and further, to use means which, when the turret is rotated relatively to the craft, impart to this support such a rotation relative to this turret that the cardanic axes of the body remain parallel to the cardanic axes of the stabilizing means in spite of the rotation of the turret.

The accompanying drawings illustrate three constructional examples of a rangefinder stabilization according to the invention, each in a horizontal and a vertical section, these three examples being represented by Figures 1 and 2, 3 and 4, and 5 and 6, respectively.

Figure 2:
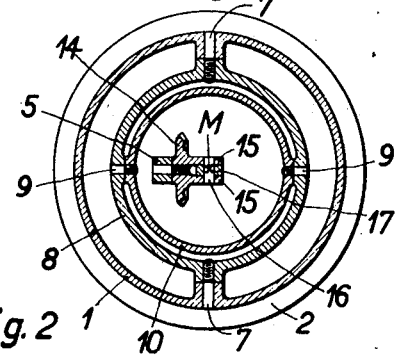

In the constructional example according to Figures 1 and 2, 1 is a tubular support which is assumed to be fixed to a ship 3 by means of a flange 2. By means of a foot 5, a bush 4 is rotatably mounted on this support 1. The bush 4 may rotate about an axis X—X which has such a position relative to the ship that it is vertical when the ship is in smooth water. In the bush 4 a rangefinder 6 (represented in the drawings for the sake of simplicity as a tube only) is mounted for rotation about an axis Y—Y intersecting at right angles the axis X—X. the axes X—X and Y—Y represent the axis for horizontal rotation and the axis for vertical rotation of the rangefinder, respectively. By means of two pins 7, a ring 8, and two pins 9 a cup-shaped body 10 is cardanically so mounted on the support 1 that the point of intersection M of its cardanic axes (the cardan centre) lies in the axis for horizontal rotation X—X. The stabilization of the body 10 is effected by means of a pendulum 11 fixed to the same, this pendulum maintaining the position of the body 10 in the space regardless of the ship's movements.

At the foot 5, a bevel wheel 13 is mounted for rotation together with a shaft 12 in such a manner that the axis of this shaft 12 coincides with the axis for horizontal rotation X—X. The bevel wheel 13 meshes with a bevel wheel 14 which is supported at the foot 5 and rotates about an axis intersecting at right angles the axis X—X and containing the cardanic centre M. The bevel wheel 14 has two ears 15 by means of which it is rotated about a pin 16. The pin 16 is fixed to a piece 17 disposed between the stops 15. By means of a pin 18, this piece 17 is so mounted on the body 10 that it may rotate about an axis which contains the cardanic centre M and is vertical. In all other respects the device is so constructed that the axis of the pin 16 intersects at right angles, at the cardanic centre M, the axis of the pin 18 as well as the axis of rotation of the bevel wheel 14. Rotations of the shaft 12 are transmitted by means of a pair of bevel wheels 19 to one crown wheel 20 of a differential gear whose other crown wheel 21 is part of a loosely rotatable wheel body 22 which is mounted on the bush 4. The planet wheel 23 of the differential gear is rotatably mounted on the bent end of a shaft 24 which extends through a bore in the wheel body 22. The wheel body 22 has also a bevel wheel 25 which may be driven by means of a hand wheel 27 and a bevel wheel 26. The rotations of the shaft 24 are transmitted to a wheel 28 meshing with a wheel rim 29 of the rangefinder 6.

The described coupling of the body 10 to the rangefinder 6 works in the following manner.

When the ship 3 is oscillating in a plane at right angles to the axis for vertical rotation Y—Y of the rangefinder 6, the bevel wheel 13 rolls on the bevel wheel 14, which is due to this bevel wheel 14 being connected to the stabilized body 10 and remaining at rest with the same. As a consequence, the bevel wheel 13 rotates about its axis, and the rangefinder 6 is rotated about its axis for vertical rotation Y—Y by means of the pair of bevel wheels 19 and the differential gear 20, 21, 23. The wheels are given such transmissions that the angle through which the rangefinder is rotated as a consequence of the oscillations of the ship is permanently equal to that angle through which the ship 3, owing to its oscillations relative to the body 10, is turned in a plane at right angles to the axis for vertical rotation Y—Y of the rangefinder. These two rotations are effected in opposite senses and, consequently, the adjusted altitudinal angle of the rangefinder is maintained regardless of the ship's oscillations.

When the ship oscillates in the vertical plane containing the axis for vertical rotation Y—Y of the rangefinder, the rangefinder is not imparted any rotations about the axis Y—Y, since the positions of the bevel wheels 13 and 14 relative to each other remain unchanged. In the said vertical plane, only the ship 3 and, consequently, the support 1, the foot 5, the rangefinder 6 and the different wheels rotate relatively to the body 10.

When the rangefinder is turned horizontally about the axis X—X, the fact that, by means of the ears 15, the bevel wheel 14 is rotatable about the pin 16 of the piece 17, and the latter about the pin 18 in the body 10, causes the piece 17 to effect a corresponding rotation, which is required for a correct working of the device.

The purpose of the handwheel 27 is to impart to the rangefinder 6 by way of the differential gear 20, 21, 23 adjustments through any altitudinal angles so as to adapt the sighting plane of this rangefinder to any position of an aircraft. This altitudinal-angle adjustment by hand as well as the automatic adjustment of the altitudinal angle for counter-acting the ship's oscillations do not influence each other.

Those parts of the two other constructional examples represented by the drawings which are equal to the corresponding parts of the first example (and which are designated accordingly) are not described in the following.

The second constructional example (cf. Figures 3 and 4) differs from the first one substantially in the other manner of coupling the stabilizing body 10 and the rangefinder 6. Moreover, the bush connected to the foot consists of two parts 4a and 4b.

The body 10 has a plane plate whose upper surface 10a contains the cardanic centre M and which is maintained in horizontal position by the pendulum 11. Against this upper surface 10a rests one end of a pin 30 mounted in a guide piece 5a of the foot 5 and displaceable parallel to the axis for horizontal rotation X—X of the rangefinder 6. The other end of the pin 30 rests against the lower surface 31 of a plate 32 containing the axis for vertical rotation Y—Y of the rangefinder 6. This plate 32 belongs to a bush 33 loosely mounted on the rangefinder 6 for rotation about the axis Y—Y. A pressure spring 34, which surrounds the pin 30 and rests on the one hand against the guide piece 5a and on the other hand against a collar 35 of the pin 30, continuously presses the pin 30 against the surface 10a. A draw spring 36 between the plate 32 and the guide piece 5a maintains the contact of the plate 32 and the pin 30. The length of the pin 30 is equal to the distance of the axis for vertical rotation Y—Y from the cardanic centre M. As a consequence, the surface 31 of the plate 32 is continuously parallel to the surface 10a of the body 10, regardless of the ship's oscillations; in other words, the angle through which the ship's oscillations cause the bush 33 to rotate relatively to the rangefinder 6 about the axis Y—Y, that is to say in a plane at right angles to the axis Y—Y, is permanently equal to that angle through which the ship is rotated in this plane relatively to the body 10.

On a flange 37 of the bush 33 is rotatably mounted a worm 38 meshing with a worm wheel rim 39 which is so fixed to the rangefinder 6 that its axis coincides with the axis for vertical rotation Y—Y. This worm gear 38, 39 permits, by means of a handwheel 40, to impart to the rangefinder 6 adjustments at any altitudinal angles. On the other hand, it causes the rangefinder to be carried along when oscillations of the ship make the bush 33 rotate about the axis Y—Y.

Figure 3:
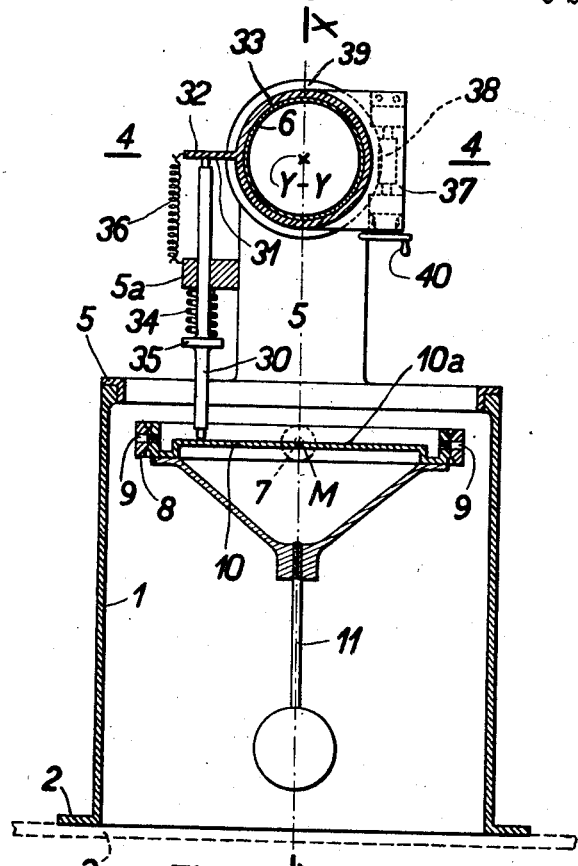
Figure 4:
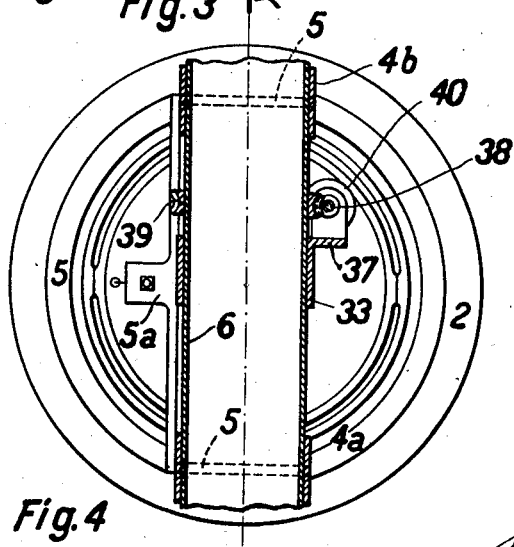
Figure 5:
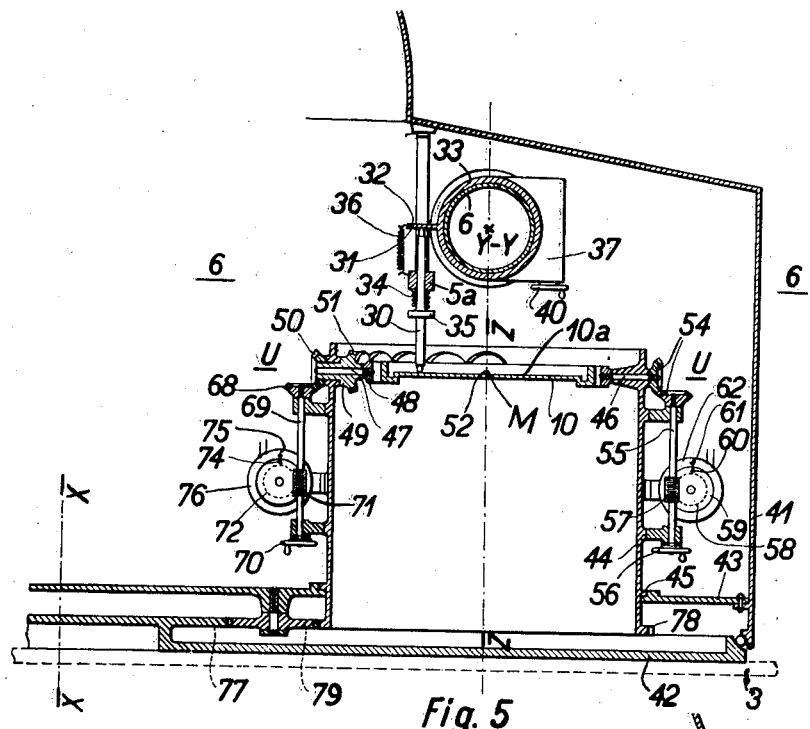
Figure 6:
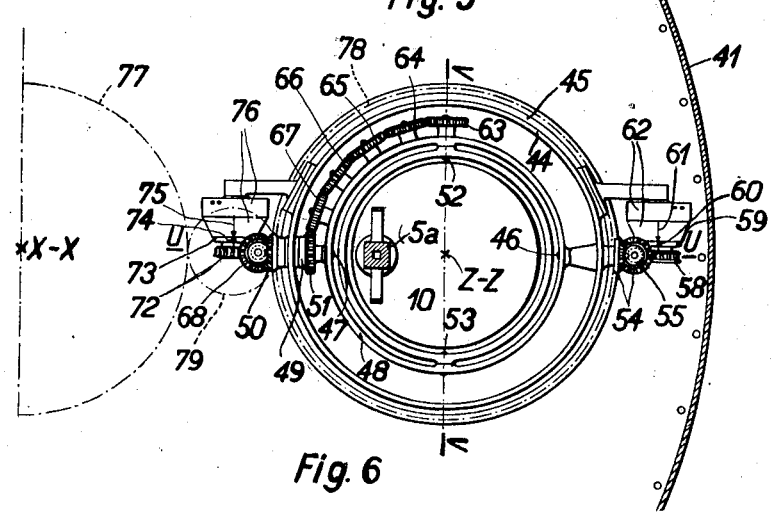

In the third constructional example (cf. Figures 5 and 6), the coupling of the rangefinder 6 and the body 10 exactly corresponds to that of the second example (Figures 3 and 4). The third example differs from the second example substantially in that the rangefinder 6 is housed in a turret 41 in which it rotates vertically. This turret 41, which is mounted on a support plate 42 fixed to the ship 3, is rotatable about an axis X—X that is vertical when the ship is in smooth water and which is displaced relatively to the cardanic centre M. The guide piece 5a for the pin 30 is fixed to the turret 41. The axis for rotation of the turret X—X also represents the axis for horizontal rotation of the rangefinder 6. A further difference from the second example consists therein that the body 10 is stabilized not by a pendulum but by a special stabilizing means, which is not represented in the drawings, this stabilizing means being assumed to be so disposed on the ship that its cardanic axes do not participate in the rotations of the turret 41.

The cardanic bearing of the body 10 in the turret 41 is as follows. A tubular support 44, rotatable about an axis Z—Z, is mounted by means of a flange 45 on a plate 43 riveted to the turret, the said axis Z—Z being parallel to the axis X—X and intersecting at right angles the axis for vertical rotation Y—Y of the rangefinder 6. By means of two pins 46 and 47, a ring 48 is mounted on this support 44, this ring rotating about an axis U—U intersecting at right angles the axis of rotation Z—Z at the point M. Whereas the pin 46 is received direct by the support 44, the pin 47 is mounted in a wheel body 49 rotatable in the support 44 about the axis U—U and provided with two bevel wheel rims 50 and 51. By means of two pins 52 and 53, the body 10 is mounted on the ring 48 for rotation about an axis V—V which intersects at right angles the axis U—U at M. By means of a pair of bevel wheels 54, a shaft 55 rotatably mounted on the support 44 and a handwheel 56, the ring 48 may be rotated about the axis U—U relatively to the support 44. The rotation of the shaft 55 is transmitted to a worm wheel 58 by means of a worm 57. A disc 59 rigidly connected to this wheel 58 has an index 60 which constitutes a following mechanism together with an index 61 belonging to a receiver 62. On the pin 52 is disposed a bevel wheel 63 which, for rotation of the body 10 about the axis V—V, relative to the ring 48, may be driven by means of four bevel wheels 64, 65, 66, 67 and the bevel wheel rim 51 of the wheel body 49. To the wheel body 49 is imparted a rotation by means of a bevel wheel 68, which meshes with the bevel wheel rim 50, a shaft 69 rotatably mounted on the support 44, and a handwheel 70. The rotation of the shaft 69 is transmitted by a worm 71 to a worm wheel 72. A disc 73 rigidly connected to this wheel 72 has an index 74 which constitutes a following mechanism together with an index 75 belonging to a receiver 76. The two receivers 62 and 76 are driven by corresponding transmitters of the above-mentioned stabilizing means (these transmitters not being represented in the drawings). As a consequence, by maintaining in coincidence the indices 60, 61 and 74, 75, respectively, by means of the handwheels 56 and 70, the body 10 may be kept in that position in the space in which the surface 10a is horizontal, and this regardless of the ship's oscillations. With a view to prevent the cardanic axes U—U and V—V of the body 10 from participating in the rotations of the turret 41 about the axis X—X and, as required for correct stabilization of the body 10, make them remain parallel to the corresponding cardanic axes of the said stabilizing means, there is to be imparted to the support 44, when the turret 41 is rotated about the axis X—X of which rotation the support 44 partakes on account of its being mounted on the plate 43 of the turret 41, a rotation about the axis Z—Z the angular value of which is equal to that of the rotation of the turret and whose sense of rotation is reverse to that of the rotation of the turret. For this reason the support 42 is provided with a toothed-wheel rim 77, and the support 44 with a toothed-wheel rim 78. These two wheel rims have equal pitch-line diameters and equal circular pitches and mesh with a toothed wheel 79 rotatably mounted on the plate 43.

We claim:

1. A rangefinder, means for mounting the rangefinder upon a support fixed on board ship, these means comprising a frame disposed on this support and rotating about an axis (azimuthal axis) approximately at right angles to the deck of the ship, the rangefinder being disposed in this frame and rotating about an axis (elevational axis) approximately parallel to the deck of the ship, a body cardanically so mounted upon this support that the cardan centre lies in the said azimuthal axis, a coupling piece so mounted upon this body as to be rotatable about an axis traversing the said cardan centre, means for so stabilizing the said body that the axis of rotation of the said coupling piece remains vertical in spite of oscillations of the ship, these stabilizing means being stationary with respect to rotations of the rangefinder relative to the said support, means for so coupling the rangefinder to the said body that those oscillations of the ship which may cause a rotation of the said support relative to the body about an axis parallel to the elevational axis of the rangefinder impart to the rangefinder a rotation about this axis, these coupling means comprising a wheel gear, one member of the wheel gear being disposed at the said frame and rotating about an axis parallel to the said elevational axis and traversing the said cardan centre, and another member being fixed to the rangefinder, the first said member being coupled to the said coupling piece.

2. A rangefinder, means for mounting the rangefinder upon a support fixed on board ship, these means comprising a frame disposed on this support and rotating about an axis (azimuthal axis) approximately at right angles to the deck of the ship, the rangefinder being disposed in this frame and rotating about an axis (elevational axis) approximately parallel to the deck of the ship, a body cardanically so mounted upon this support that the cardan centre lies in the said azimuthal axis, a coupling piece so mounted upon this body as to be rotatable about an axis traversing the said cardan centre, means for so stabilizing the said body that the axis of rotation of the said coupling piece remains vertical in spite of oscillations of the ship, these stabilizing means being stationary with respect to rotations of the range-finder relative to the said support, means for coupling the rangefinder to the said body, these coupling means comprising a wheel gear, one member of this wheel gear being disposed at the said frame and rotating about an axis parallel to the said elevational axis and traversing the said cardan centre, and another member being fixed to the rangefinder, the first said member being so coupled to the said coupling piece that those oscillations of the ship which may cause a rotation of the said support relative to the said body about an axis parallel to the elevational axis of the rangefinder impart to this member a rotation about its axis, in consequence whereof the rangefinder is rotated about its elevational axis.

ADOLF STEINLE.
OTTO SCHREIBER.